US012739865B2

(12) United States Patent
Mukherjee

(10) Patent No.: US 12,739,865 B2
(45) Date of Patent: Sep. 15, 2026

(54) CHANNEL MONITORING AND SHARED USE OF A WIRELESS CHANNEL

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 1040 days.

(21) Appl. No.: 17/239,964

(22) Filed: Apr. 26, 2021

(65) Prior Publication Data

US 2021/0243769 A1 Aug. 5, 2021

Related U.S. Application Data

(63) Continuation of application No. 15/999,266, filed on Aug. 17, 2018, now Pat. No. 11,013,014.

(51) Int. Cl.

| | |
|---|---|
| ***H04W 72/542*** | (2023.01) |
| ***H04W 24/08*** | (2009.01) |
| *H04W 56/00* | (2009.01) |

(52) U.S. Cl.
CPC ......... *H04W 72/542* (2023.01); *H04W 24/08* (2013.01); *H04W 56/001* (2013.01)

(58) Field of Classification Search
CPC .. H04W 72/542; H04W 24/08; H04W 56/001
See application file for complete search history.

(56) References Cited

U.S. PATENT DOCUMENTS

| | | | | |
|---|---|---|---|---|
| 2016/0044516 | A1* | 2/2016 | Hedayat ................ | H04W 16/14 370/329 |
| 2016/0295630 | A1* | 10/2016 | Gubeskys ............ | H04B 7/0456 |
| 2017/0142592 | A1* | 5/2017 | Fischer ................. | H04W 16/14 |
| 2017/0223737 | A1 | 8/2017 | Patel et al. | |

(Continued)

FOREIGN PATENT DOCUMENTS

WO 2018031136 A1 2/2018

OTHER PUBLICATIONS

International Search Report, PCT/US2019/46285, dated Nov. 13, 2019, pp. 1.

*Primary Examiner* — Un C Cho
*Assistant Examiner* — Alan L Lindenbaum
(74) *Attorney, Agent, or Firm* — Armis IP Law, LLC

(57) ABSTRACT

According to one configuration, a wireless network includes first wireless stations and second wireless stations. The first wireless stations and second wireless stations support different wireless communication protocols and compete to use a wireless channel. Via monitoring of a control channel generated by a management resource associated with at least the first wireless stations, a given wireless station of the second wireless stations determines availability (unused time slots, frames, etc.) of the wireless channel via monitoring of the wireless channel itself and/or a control channel. In the latter instance, the control channel indicates scheduled usage of the shared wireless channel by at least the first wireless stations. In accordance with the scheduled usage as indicated by the control channel, the given wireless station transmits over the wireless channel during free slots, times, gaps, etc., to communicate with a remote wireless station of the second wireless stations.

46 Claims, 8 Drawing Sheets

(56) References Cited

U.S. PATENT DOCUMENTS

2017/0251372 A1 8/2017 Belghoul et al.
2018/0192295 A1 7/2018 Mueck et al.
2018/0242184 A1 8/2018 Yerramalli et al.
2019/0036629 A1 1/2019 Sundaresan et al.
2019/0124664 A1 4/2019 Wang
2019/0223037 A1 7/2019 Raghothaman
2019/0335337 A1 10/2019 Damnjanovic et al.
2020/0037321 A1 1/2020 Karimli et al.
2020/0037322 A1 1/2020 Karimli et al.
2021/0297869 A1* 9/2021 Zhou ................. H04W 74/0816

* cited by examiner

CHANNEL MONITORING AND SHARED USE OF A WIRELESS CHANNEL

RELATED APPLICATION

This application is a continuation application of earlier filed U.S. patent application Ser. No. 15/999,266 entitled "CHANNEL MONITORING AND SHARED USE OF A WIRELESS CHANNEL," filed on Aug. 17, 2018, the entire teachings of which are incorporated herein by this reference.

BACKGROUND

Conventional wireless networks include any of different types of communication devices supporting different wireless protocols. For example, one type of wireless network supports LTE (Long Term Evolution) communications in which user equipment is able to communicate with a base station (such an eNodeB) based on use of the LTE protocol to access a respective network. In certain instances, LTE networks and corresponding communication devices rely on use of a channel manager (a.k.a., LAA or Licensed Assistant Access) and its enhancements to indicate scheduling of future downlink and uplink operations so that the users of the unlicensed spectrum know when it is scheduled for use.

Use of the unlicensed spectrum has expanded to include so-called New Radio technology in which respective wireless stations communicate with each other in accordance with the New Radio 5G protocol. Conventional communication devices implementing the 5G protocol do not support LTE communications. Therefore, wireless stations supporting the 5G protocol cannot use schedule information broadcasted by a LAA channel manager.

As an alternative to using the LAA channel information, one way to avoid collisions in the shared unlicensed spectrum between wireless stations supporting the 5G protocol and wireless stations supporting the LTE protocol is to employ a so-called listen before talk (LBT) technology, which in theory, reduces or eliminates wireless interference because devices constantly listen to the channel for nonuse prior to transmitting.

BRIEF DESCRIPTION OF EMBODIMENTS

There are deficiencies associated with conventional techniques of providing wireless connectivity using mixed wireless technology such as the LTE, Wifi™, and 5G protocols. For example, implementing the listen before talk (LBT) technology in the New Radio 5G devices may help to reduce or eliminate wireless interference in an unlicensed spectrum in which different users communicate via the LTE protocol and the 5G protocol. However, implementation of listen before talk technology requires a substantial amount of energy, resulting in a waste of power available from an energy source such as a battery.

Embodiments herein provide novel ways of improving coexistence of communication devices supporting different wireless communication protocols.

First Embodiments

In one example embodiment, a wireless network as discussed herein includes first wireless stations and second wireless stations. The first wireless stations support communications via a first communication protocol (such as the LTE communication protocol, Wifi™ protocol, etc.). The second wireless stations support communications via a second wireless communication protocol (such as a 5G New Radio communication protocol). The first wireless stations and second wireless stations compete to use the same wireless channel such as an unlicensed channel in the 5 GHz band or shared channel allocated from the CBRS (Citizens Band Radio Service) band.

Assume that a given wireless station (supporting the second wireless communication protocol) monitors a control channel generated by a management resource managing the wireless channel. In one embodiment, the control channel indicates scheduled usage of the shared wireless channel by at least the first wireless stations. Via the monitoring of the control channel, the given wireless station determines availability (unused time slots, frames, etc.) of the wireless channel. Based on the determined availability, the wireless station uses the wireless channel to communicate via the second communication protocol.

In one embodiment, the control channel is communicated in accordance with the first communication protocol. The first communication protocol is any suitable wireless communication protocol. In one embodiment, the first wireless communication protocol is the LTE communication protocol. The second communication protocol is any suitable protocol such as a 5G New Radio communication protocol. Accordingly, in one embodiment, the first communication protocol is different than the second communication protocol.

In accordance with further embodiments, the wireless channel is an unlicensed or shared wireless channel in the CBRS (Citizens Band Radio Service) band in which the first wireless stations and the second wireless stations share use. The wireless channel can be reallocated such that the first wireless stations and second wireless stations are no longer able to use the wireless channel.

In one embodiment, the given wireless station (supporting the second communication protocol) defers use of the wireless channel in response to detecting that the wireless channel (portion of shared unlicensed spectrum) is currently used or will be used by one of the first wireless stations. In other words, the given wireless station uses the wireless channel when it is free from being used by the first wireless stations. Yet further embodiments herein include: prior to using the wireless channel to communicate amongst the second wireless stations via the second communication protocol based on determined availability, monitoring a level of wireless energy present in the wireless channel. In one embodiment, the wireless station uses the wireless channel to communicate amongst the second wireless stations via the second communication protocol in response to detecting that the wireless energy present in the wireless channel is below a threshold value (which indicates that no other communication devices are currently using the wireless channel).

In accordance with yet further embodiments, via monitoring of the control channel, the given wireless station supporting the second communication protocol receives schedule information indicating: i) a first time range in which the first stations are scheduled to use the wireless channel, and ii) a second time range in which the first stations are not scheduled to use the wireless channel. During the second time range, the given wireless station communicates (via the second communication protocol) to a second wireless station of the second wireless stations.

In one embodiment, as previously discussed, use of the wireless channel to communicate amongst second wireless stations via the second communication protocol is contingent upon a detected level of wireless energy in the monitored control channel. In other words, if the given wireless station detects that the wireless channel is used by one of the first wireless stations based on the detected level of wireless energy, the given wireless station does not attempt to communicate over the wireless channel. In accordance with further embodiments, using the wireless channel to communicate amongst the second wireless stations via the second communication protocol includes: during a time slot in which the wireless channel is detected as being available as indicated by the control channel, communicating a scheduling request from the given wireless station to another wireless station.

In accordance with yet further embodiments, the control channel is a first control channel. A wireless station (such as a second controller) transmits a second control channel in accordance with the second communication protocol, the second control channel indicating usage of the wireless channel by the second stations. If desired, a single control channel can be used to indicate scheduling of communications by bot the first wireless stations and the second wireless stations.

Second Embodiments

In another example embodiment, a wireless network as discussed herein includes first wireless stations and second wireless stations. The first wireless stations support communications via a first communication protocol (such as the LTE communication protocol, Wifi™ protocol, etc.). The second wireless stations support communications via a second wireless communication protocol (such as a 5G New Radio communication protocol). The first wireless stations and second wireless stations compete to use the wireless channel (such as bandwidth in a non-licensed frequency spectrum).

Assume that a given wireless station (supporting the second wireless communication protocol) monitors a wireless signal indicating usage of the wireless channel by the first wireless stations communicating via a first wireless communication protocol. Assume further that, via the monitoring of the wireless signal, the given wireless station detects use of the wireless channel by a first wireless station communicating via the first wireless communication protocol. Based on the detected use, the given wireless station selectively controls transmission of communications from the given wireless station over the wireless channel; the given wireless station communicates via a second wireless communication protocol which is different than the first wireless communication protocol.

The given wireless station can be configured to operate in any manner depending on the detected use (intended or actual use) of the wireless channel.

For example, in one embodiment, the given wireless station can be configured to control transmission of communications from the given wireless station over the wireless channel by deferring (or delaying), based on the detected use, wireless communications from the given wireless station to another wireless station supporting the second communication protocol. More specifically, in response to detecting presence of at least one symbol in the wireless signal indicating use of the wireless channel by a first wireless station communicating via the first wireless communication protocol, the given wireless station is prevented from using the wireless channel. In other words, if it is known that the wireless channel is going to be used or is being used by another communication device communicating via the first wireless communication protocol, the given wireless station waits until the wireless channel is free again to use it.

The given wireless station can be configured to monitor any suitable parameter to determine use of the wireless channel by the first wireless stations. For example, in one embodiment, the given wireless station detects use of the wireless channel by another wireless station via monitoring for presence of one or more types of wireless communications (such as one or more symbols or messages) in the monitored wireless signal (channel). The messages can be of any type such as: i) a PSS (Primary Synchronization Signal), ii) a SSS (Secondary Synchronization Signal), and iii) a CRS (Cell Specific Reference Signal) message, etc.

Presence of any of these signals in the monitored wireless channel indicates that the first wireless stations may be or is using the wireless channel to transmit uplink and/or downlink data.

In accordance with further embodiments, the given wireless station can be configured to monitor a level of wireless energy in the wireless channel (such as in accordance with listen before talk) to determine whether to transmit from the second wireless station over the wireless channel. Further embodiments herein include adjusting a respective energy threshold value of monitoring for presence of communications based on knowing that one or more wireless stations are present using the wireless channel to communicate using the first communication protocol. More specifically, embodiments herein include adjusting a wireless energy detection threshold value of the given wireless station based on communications transmitted over the wireless channel via the first communication protocol.

In yet further embodiments, the wireless station monitors the wireless channel in one or more particular time slots to determine whether the wireless channel is free from use. The given wireless station communicates to a third wireless station during gaps in which other wireless stations do not use the wireless channel as indicated by the monitored wireless signal.

As an alternative to monitoring for specific signals present in the wireless channel, as previously discussed, the given wireless station can be configured to monitor a supplemental control channel that broadcasts schedule information regarding use of the wireless channel by the first wireless stations. In such an instance, the second wireless station communicates to user equipment in a particular time slot such that the second wireless station does not interfere with communications scheduled for transmission over the wireless channel via the first communication protocol.

Embodiments herein are useful over conventional techniques. For example, the use of scheduling information amongst the stations supporting different wireless protocols alleviates or reduces the need to implement listen before talk technology, which typically draws unneeded energy from a respective battery of the wireless station. For example, if it is known that a wireless station is going to communicate, the monitoring wireless station can be configured to wait until the wireless channel becomes available for use to transmit data.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate use of a wireless channel by wireless stations supporting different communication protocols. The instructions, when executed by computer processor hardware, cause the computer processor hardware (such as one or more co-located or disparately processor devices) to: monitor a wireless signal indicating usage of a wireless channel by a first wireless station communicating via a first wireless communication protocol; via the monitoring of the wireless signal, detect use of the wireless channel by the first wireless station; based on the detected use, control transmission of communications from a second wireless station over the wireless channel, the second wireless station communicating via a second wireless communication protocol.

Another embodiment includes a computer readable storage medium and/or system having instructions stored thereon to facilitate use of a wireless channel by wireless stations supporting different communication protocols. The instructions, when executed by computer processor hardware, cause the computer processor hardware (such as one or more co-located or disparately processor devices) to: monitor a control channel indicating usage of a wireless channel by first wireless stations communicating via a first communication protocol; via the monitoring of the control channel, determine availability of the wireless channel; and based on the determined availability, using the wireless channel to communicate amongst second wireless stations via a second communication protocol, the second communication protocol different than the first communication protocol.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting simultaneous use of multiple wireless protocols (such as 5G New Radio and LTE) by multiple wireless stations. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
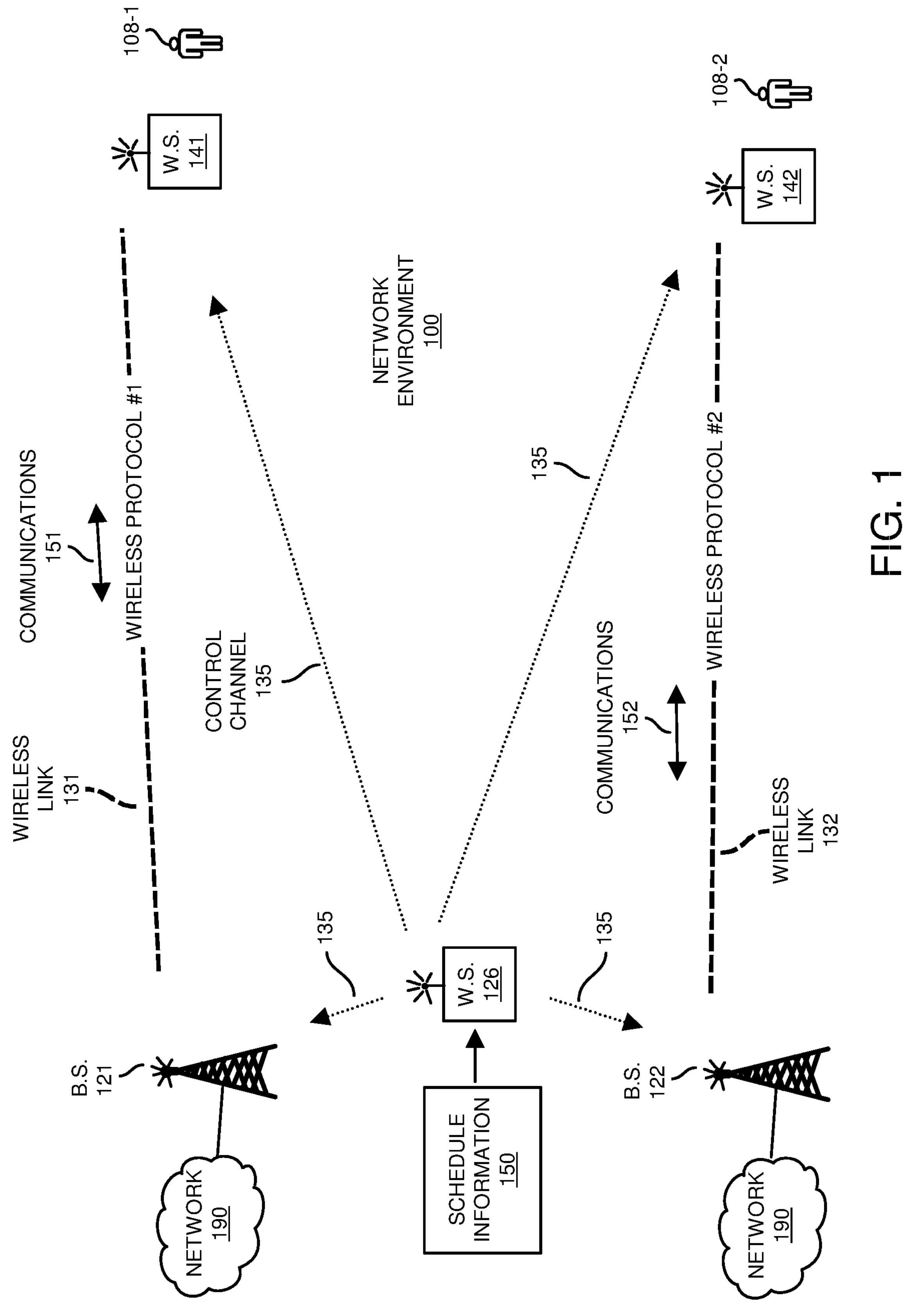
FIG. 1 is an example diagram illustrating a wireless network environment and use of a control channel to distribute schedule information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a communication system includes first wireless stations and second wireless stations. The first wireless stations and second wireless stations support different wireless communication protocols and compete to use a wireless channel. Via monitoring of a control channel generated by a management resource associated with the first wireless stations and first communication protocol, a given wireless station of the second wireless stations determines availability (such as unused time slots, frames, etc.) of the wireless channel via monitoring of the control channel. In one embodiment, the control channel indicates scheduled usage of the shared wireless channel by at least the first wireless stations. In accordance with the scheduled usage as indicated by the control channel, the given wireless station transmits over the wireless channel during free slots, times, etc., to communicate with a remote wireless station of the second wireless stations.

Additionally, or alternatively, the given wireless station can be configured to monitor the wireless channel itself and/or respective timeslots of the wireless channel to determine whether the wireless channel is available for use to communicate using the second communication protocol.

Now, more specifically, FIG. 1 is an example diagram illustrating a wireless network environment and shared use of a respective wireless channel according to embodiments herein.

In this example embodiment, the network environment 100 includes first wireless stations operable to communicate with each other over a shared wireless channel (such as an unlicensed CBRS channel). More specifically, via the shared wireless channel, the wireless link 131 supports communications 151 between the base station 121 (such as an eNodeB) and the wireless station 141 (user equipment operated by user 108-1); the wireless link 132 supports communications 152 between the base station 122 (such as a gNodeB) and the wireless station 142 (NR 5G user equipment operated by user 108-2).

As previously discussed, the first wireless stations (such as base station 121, wireless station 141, etc.) and second wireless stations (such as base station 122, wireless station 142, etc.) compete to use the wireless channel.

In one embodiment, the shared wireless channel (such as bandwidth in a non-licensed frequency spectrum) used by the network environment 100 to support wireless link 131 and wireless link 132 is a portion of bandwidth in the 3.5 GHz called CBRS (Citizen Band Radio Service), ideally suited for use in-building small cells or other wireless systems.

The communication system in network environment 100 further includes wireless station 126. As shown, the wireless station 126 (such as a scheduling manager) transmits schedule information 150 (example in FIG. 2) over the control channel 135 in accordance with a first wireless communication protocol (such as wireless protocol #1 or the LTE protocol).

In one embodiment, the wireless station 126 wirelessly broadcasts the schedule information 150 over the control channel 135 to any listening wireless stations in network environment 100 such as base station 121 (wireless station), base station 122 (wireless station), wireless station 141, wireless station 142, etc.

The communication devices such as base station 121, wireless station 141, etc., support any suitable one or more wireless protocols such as LTE communications, Wi-Fi communications, etc.

In one embodiment, the control channel 135 is a so-called Licensed Assist Access (LAA) channel supporting LTE broadcast of the schedule information 150 to any listening communication devices. As its name suggests, the control channel 135 facilitates shared use of the wireless channel amongst the wireless stations. For example, in one embodiment, the communication devices supporting the first wireless communication protocol use the schedule information 150 as a basis to identify scheduled uplink downlink transmissions to prevent interference on the shared wireless channel.

In accordance with further embodiments, the schedule information 150 indicates when wireless communications 131 are scheduled for transmission over the wireless channel shared by first wireless stations (such as base station 121, wireless station 141, etc.) using a first wireless protocol (such as LTE communications) to communicate amongst each other such as over the wireless link 131 between the base station 121 and the wireless station 141. If desired, the schedule information 150 can include information indicating when communications 152 are scheduled for transmission over the wireless channel via the second wireless protocol.

In accordance with further embodiments, the wireless station 126 transmits the schedule information 150 over the control channel 135 in accordance with the first wireless communication protocol (wireless protocol #1).

Although the communication devices such as wireless base station 122, wireless station 142, etc., support the wireless protocol #2 (such as a 5G New Radio communication protocol), such devices are also configured to decode wireless communications transmitted in accordance with the first wireless protocol (wireless protocol #1) in order to decode the schedule information 150 transmitted over the control channel 135.

Accordingly, even though the second wireless stations such as base station 122, wireless station 142, etc., are configured to support the second wireless communication protocol, these wireless stations are able to monitor the control channel 135 and decode communications transmitted via the first wireless communication protocol (wireless protocol #1) to identify when uplink or downlink communications 131 are scheduled for transmission over the shared wireless channel. As further discussed below, the second wireless stations (such as base station 122, wireless station 142, etc.) advantageously use the schedule information 150 to identify when it is free to transmit uplink or downlink communications 132 over the shared wireless channel using the second wireless communication protocol (such as 5G).

Figure 2:
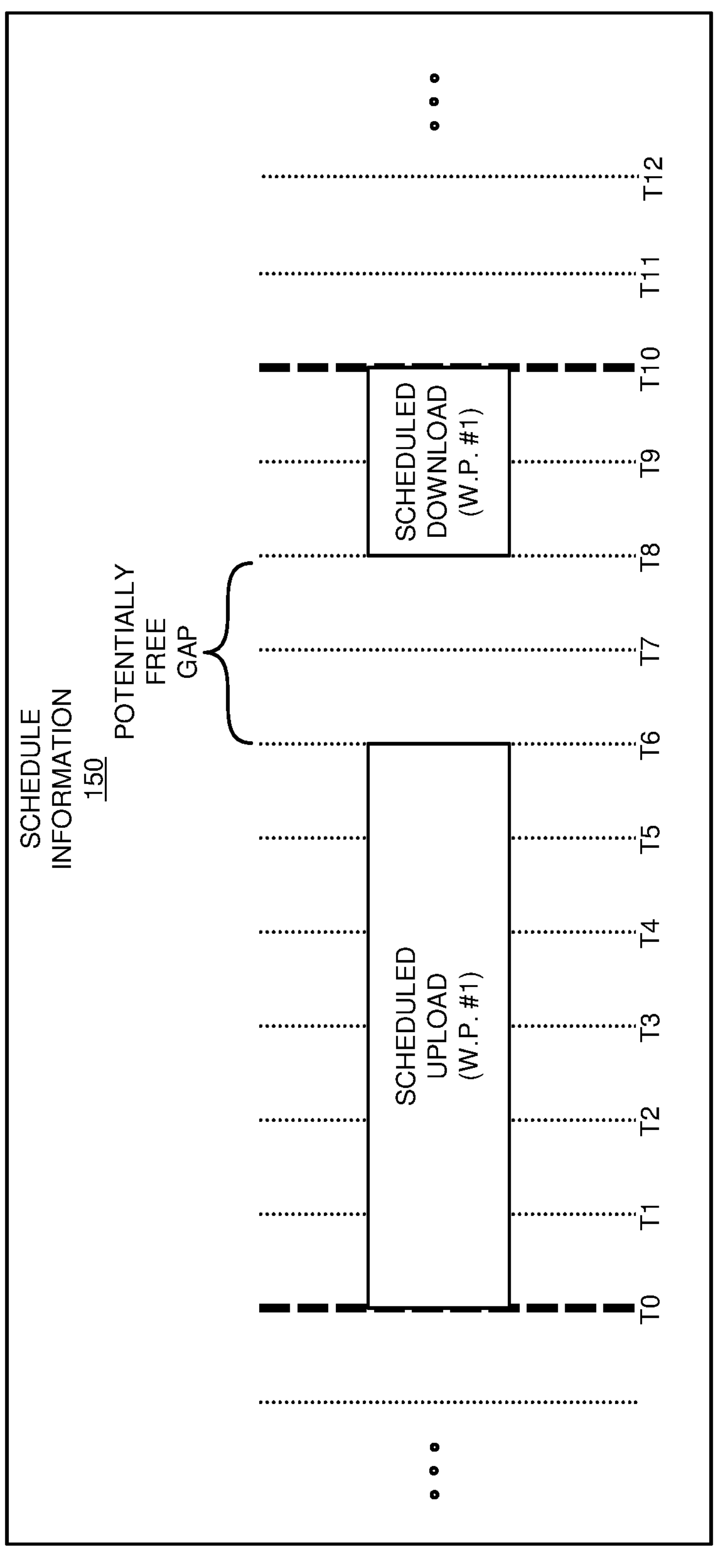
FIG. 2 is an example diagram illustrating schedule information according to embodiments herein.

FIG. 2 is an example diagram illustrating schedule information according to embodiments herein.

As further shown in this example embodiment, the schedule information 150 indicates timeslots (such as an amount of time such as one millisecond or other suitable value) in which uploads and/or downloads are scheduled for transmission over the shared wireless channel via the first wireless stations such as base station 121, wireless station 141, etc.

In this example embodiment, as shown by schedule information 150, an uplink portion of the communications 131 transmitted according to the first wireless protocol from the wireless station 141 to the base station 121 are scheduled between time TO and time T6. As further shown by schedule information 150, a downlink portion of the communications 131 transmitted according to the first wireless protocol from the base station 121 and the wireless station 141 are scheduled between time T8 and time T10. There are no communications scheduled for transmission between time T6 and time T8.

Additionally, the schedule information 150 indicates that after the burst of communications between time T0 and time T10, there are no more scheduled communications. In such an instance, the wireless stations communicating via the second wireless communication protocol are able to transmit uplink/downlink information after time T10 as the wireless channel is not being used by the first wireless stations communicating via the first wireless communication protocol.

As previously discussed, the second wireless stations are configured to decode the schedule information 150 (such as encoded digital information, symbols, etc.) transmitted over the control channel 131. In a more specific embodiment, the wireless station 142 (such as an NR-U user equipment) reads and decodes the schedule information 150 transmitted over the control channel 135 (such as LAA CPDCCH) with 15 kHz SCS carrying a number of downlink/uplink subframes within the LA transmission opportunity (TXOP).

If the wireless station 142 detects that the TXOP information in the control channel 135 indicates upcoming downlink and scheduled uplink transmissions, then the wireless station 142 performs one or more the following operations: i) the wireless station 142 defers any autonomous uplink data and or control transmissions over the wireless link 132 to the base station 122 in the used timeslots, ii) the wireless station transmits uplink data in any gaps (such as between time T6 in time T8) as indicated by the schedule information 150; such gaps may be between LTE subframes or between occupied LTE OFD symbols of the same LTE of subframe, iii) the wireless station 142 transmits a scheduling request (SR) to its serving base station 122 such that the corresponding uplink slot times granted by the base station 122 to the wireless station 142 do not overlap with transmission of communications 151, iv) the wireless station 142 adjusts its energy detection or signal detection threshold value (listen before talk threshold value) to an appropriate level based on detecting communications 150 conveyed in accordance with the first wireless protocol.

In a similar manner, the base station 122 (such as an NR-U gNodeB) reads and decodes the control channel 135 (such as LAA CPDCCH) with 15 kHz SCS carrying the number of downlink/uplink subframes within the LAA transmission opportunity (TXOP). If the base station 122 detects that the TXOP information indicates upcoming downlink and scheduled uplink transmissions, then the base station 122 performs one or more the following operations: i) the base station 122 defers its scheduled downlink data transmissions to the wireless station 142 until the wireless channel is detected as being free, ii) the base station 122 delays or defers scheduling of any uplink data transmissions from the wireless station 142 to the base station 122, iii) the base station 122 transmits downlink data from the base station 122 to the wireless station 142 in any gaps (such as between time T6 in time T8) as indicated by the schedule information 150; such gaps may be between LTE subframes or between occupied LTE OFD symbols of the same LTE of subframe, iii) the base station 122 adjusts its energy detection or signal detection threshold value (listen before talk threshold value) based on detecting communications 150 conveyed from wireless stations in accordance with the first wireless protocol.

Referring again to FIG. 1, as a further example, the wireless station 122 (supporting the second wireless communication protocol) monitors the control channel 135 (such as a wireless signal) indicating usage of the wireless channel by the first wireless stations communicating via the first wireless communication protocol. Via the monitoring of the control channel 135, the wireless station 142 detects use of the wireless channel by the first wireless station (base station 121 or wireless station 141). Based on the detected use as indicated by the schedule information 150, the wireless station 142 controls transmission of communications 152 from the wireless station 142 over the wireless channel to the base station 122 such as between time T6 and time T8.

In accordance with further embodiments, note that the schedule information 150 can be configured to keep track of scheduling communications 152 transmitted in accordance with the second wireless communication protocol. In such an instance, the first wireless stations supporting the first wireless communication protocol are notified of wireless communications scheduled for both the first wireless stations and second wireless stations. Additionally, the second wireless stations supporting second wireless communication protocol are notified wireless communications scheduled for both the first wireless stations and the second wireless stations.

More specifically, in accordance with further embodiments, a base station 122 (such as a NR gNB) can be configured to transmit a CPDCCH carrying DOWNLINK-UPLINK scheduling information in a format that is readable by LTE user equipment (such as wireless station 141 and base station 121) on the same unlicensed carrier. In other words, in one embodiment, the base station 122 (such as a gNB) transmits a LTE-based OFDM subframe with 15 kHz SCS and containing a CPDCCH that indicates how many upcoming DL+UL subframes (in LTE numerology) will be occupied by the second wireless stations (i.e., NR system).

Figure 3:
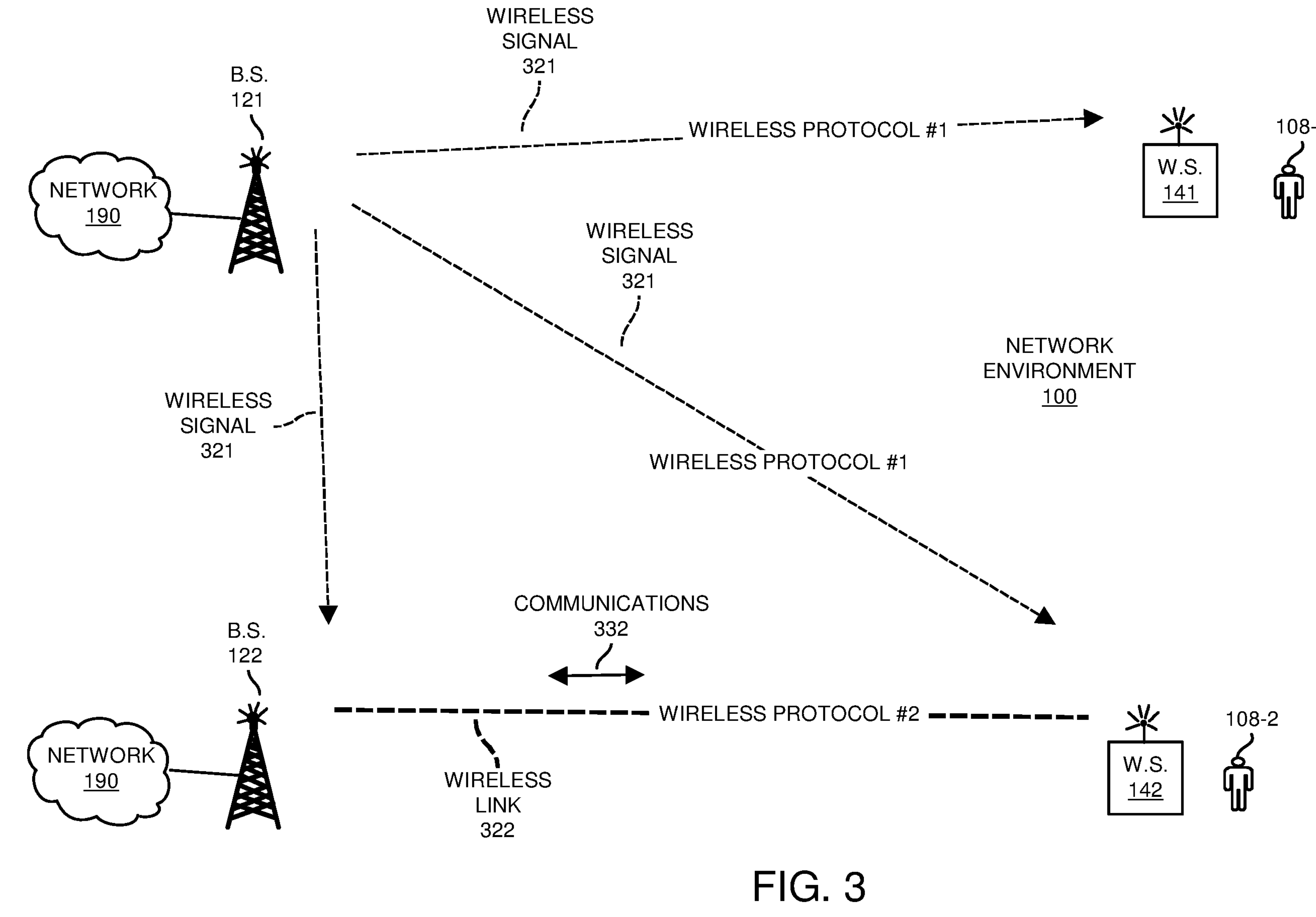
FIG. 3 is an example diagram illustrating a wireless network environment and monitoring of a wireless signal (channel) to control transmission of communications according to embodiments herein.

FIG. 3 is an example diagram illustrating a wireless network environment and monitoring of a wireless signal (channel) to control transmission of communications according to embodiments herein.

The base station 121 transmits the wireless signal 321 in the network environment 100. In one embodiment, the wireless signal 121 is a broadcast signal in which any of the wireless stations is able to decode or tune.

The wireless signal 321 can be encoded to include any suitable information. In one embodiment, the wireless signal 121 includes reference or control information facilitating communications with the base station 121 via the first wireless communication protocol.

More specifically, in response to detecting presence of at least one symbol in the wireless signal 321 indicating use of the wireless channel by the first wireless stations, the second wireless stations (such as base station 122, wireless station 142, etc.) defer use of the wireless channel.

The given wireless station (such as base station 122, wireless station 142, etc.) can be configured to monitor any suitable parameter of the wireless signal 321 (such as an LTE communication signal) to determine use of the wireless channel by the first wireless stations. For example, in one embodiment, the given wireless station detects use by another wireless station via monitoring for presence of one or more types of wireless communications (such as one or more symbols) in the wireless channel 321 such as: i) a PSS (Primary Synchronization Signal), ii) a SSS (Secondary Synchronization Signal), and/or iii) a CRS (Cell Specific Reference Signal) message, etc. The detection of PSS/SSS/CRS in the wireless signal 321 may be performed in conjunction with energy detection by the wireless station to differentiate between the presence of LTE communication devices and non-LTE communication devices communicating in the network environment 100.

In one embodiment, in response to detecting absence of any symbols in the wireless signal 321, which likely indicates non-use of the wireless channel by the first wireless stations, the given wireless station (such as base station 122 or wireless station 142) schedules transmission of or transmits communications 332 over the wireless link 322 in accordance with the wireless protocol #2.

Additionally, or alternatively, prior to transmitting any data over the wireless channel via wireless link 322, the given wireless station can be configured to implement listen before talk technology in which the given wireless station monitors a level of wireless energy in the wireless channel to determine whether to transmit from the given wireless station over the wireless channel via the second wireless communication protocol.

Alternatively, if given wireless station detects use of the wireless channel (such as via detecting PSS/SSS/CRS) in the wireless signal 321, then the given wireless station performs operations as previously discussed. For example, if the given wireless station monitoring the signal 321 is wireless station 142, and the wireless station 142 detects likely use of the use wireless channel by the first wireless stations via monitoring of the wireless signal 321, then the wireless station 142 performs one or more the following operations: i) the wireless station 142 can be configured to defer any autonomous uplink data and or control transmissions over the wireless link 132 to the base station 122, ii) the wireless station can be configured to transmit uplink data in any gaps (such as between time T6 in time T8) as indicated by the schedule information 150; such gaps may be between LTE subframes or between occupied LTE OFD symbols of the same LTE subframe, iii) the wireless station 142 can be configured to transmit a scheduling request (SR) to its serving base station 122 such that the corresponding uplink slot times granted by the base station 122 to the wireless station 142 do not overlap with transmission of communications 131, iv) the wireless station 142 adjusts its energy detection or signal detection threshold value (listen before talk threshold value) to an appropriate level based on detecting communications 150 conveyed in accordance with the first wireless protocol.

If the given wireless station monitoring wireless signal 321 is base station 122, and the base station 122 detects likely use of the wireless channel by the first wireless stations via monitoring of the wireless signal 321, then the base station 122 performs one or more the following operations: i) the base station 122 defers its scheduled downlink data transmissions to the wireless station 142 until the wireless channel is detected as being free, ii) the base station 122 delays or defers scheduling of any uplink data transmissions from the wireless station 142 to the base station 122, iii) the base station 122 transmits downlink data from the base station 122 to the wireless station 142 in any available gaps, iii) the base station 122 adjusts its energy detection or signal detection threshold value (listen before talk threshold value) based on detecting communications 150 conveyed in accordance with the first wireless protocol.

Alternatively, in another example embodiment, if the given wireless station detects use of the wireless channel by the first wireless stations, then the given wireless station may choose to transmit one or more of the communications 332 via the second wireless communication protocol even if the wireless signal strength of communications received from devices communicating over the wireless channel is above the ED threshold value due to LTE's robustness to intercell interference.

Figure 4:
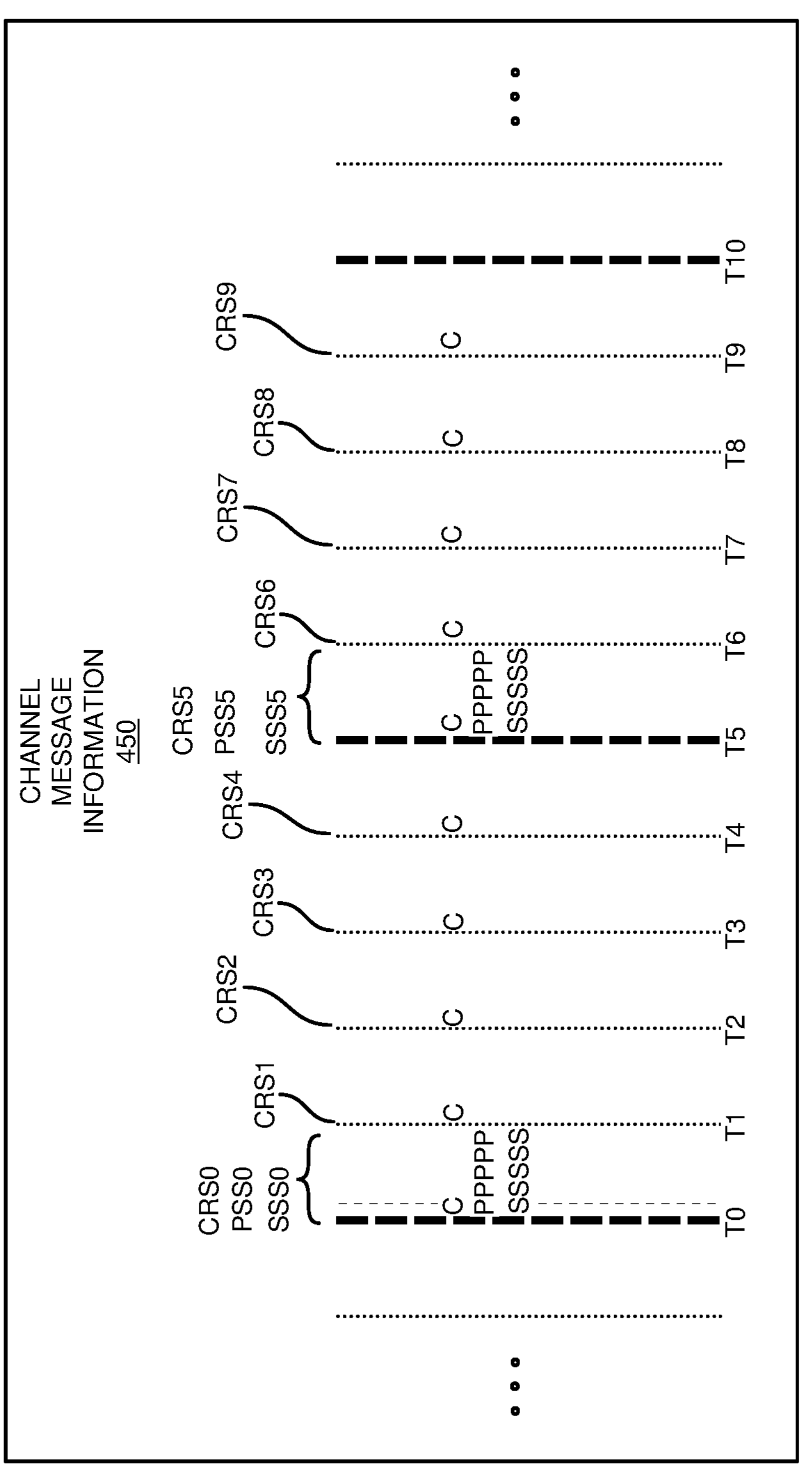
FIG. 4 is an example diagram illustrating channel message information according to embodiments herein.

FIG. 4 is an example diagram illustrating channel message information present in a wireless signal according to embodiments herein.

The wireless signal 321 transmitted from a respective wireless station such as base station 121 can include any suitable messages or event information (sequence of one or more symbols such as reference information associated with CRS, synchronization information associated with PSS/SSS, etc.).

As previously discussed, the given wireless station such as base station 122 and/or wireless station 142 monitors the wireless channel (and, more specifically, wireless signal 321) in one or more particular time slots or sub timeslots to determine whether the wireless channel is free from use. If the wireless channel is detected as being unused via absence of reference information or synchronization information, the given wireless station communicates to another wireless station during respective gaps (in which other wireless stations do not use the wireless channel) as indicated by the wireless signal 321. In this example embodiment, the channel message information 450 (such as indicating different types of channel messages, events, etc.) indicates that the base station 121 generating the signal 321 transmits control information in the different time slots. For example, in the time slot between time T0 and time T1, the base station 121 transmits CRS0 (Cell Specific Reference Signal), PSS0 (Primary Synchronization Signal), and SSS0 (Secondary Synchronization Signal) such as in accordance with the first wireless communication protocol. The wireless station such as base station 122 or wireless station 142 is configured to decode the wireless signal 321.

In one embodiment, in response to detecting presence of PSS0 and/or SSS0 in the first time slot between time T0 and T1, the monitoring wireless station defers use of the wireless channel between time T0 and T5 (next four timeslots) because presence of such events indicates that the wireless channel is likely being used to convey uplink or downlink information via the first communication protocol.

In response to detecting presence of PSS0 and/or SSS0 in the sixth time slot between time T5 and T6 of the channel message information 450, the wireless station defers use of the wireless channel between time T6 and T10 (next four timeslots) because presence of such events indicates that the wireless channel is likely being used to convey uplink or downlink information via the first communication protocol at such times.

Note that a monitoring wireless station need not detect every symbol in a respective message (CRS/PSS/SSS) conveyed over the wireless signal 321 in order to perform an appropriate action. For example, detection of one or more symbols in a sequence of a frame or sub-frame can be sufficient to indicate that presence of a message event such as CRS/PSS/SSS. To conserve on energy consumption, the wireless station detecting one or more symbols of the event message can be configured to perform any of the above actions (such discontinue listen before talk monitoring to use the respect wireless channel because it is known that the channel is being used) as discussed herein.

Further embodiments herein include adjusting a respective energy threshold value associated with the wireless station based on knowing that one or more of the first wireless stations are present using the wireless channel to communicate using the first communication protocol. More specifically, embodiments herein include adjusting a wireless energy detection threshold value of the monitoring wireless station based on communications transmitted over the wireless channel via the first communication protocol. The adjustment is made so that the wireless station is able to more accurately detect when the wireless channel is used by other wireless stations using listen before talk technology.

Figure 5:
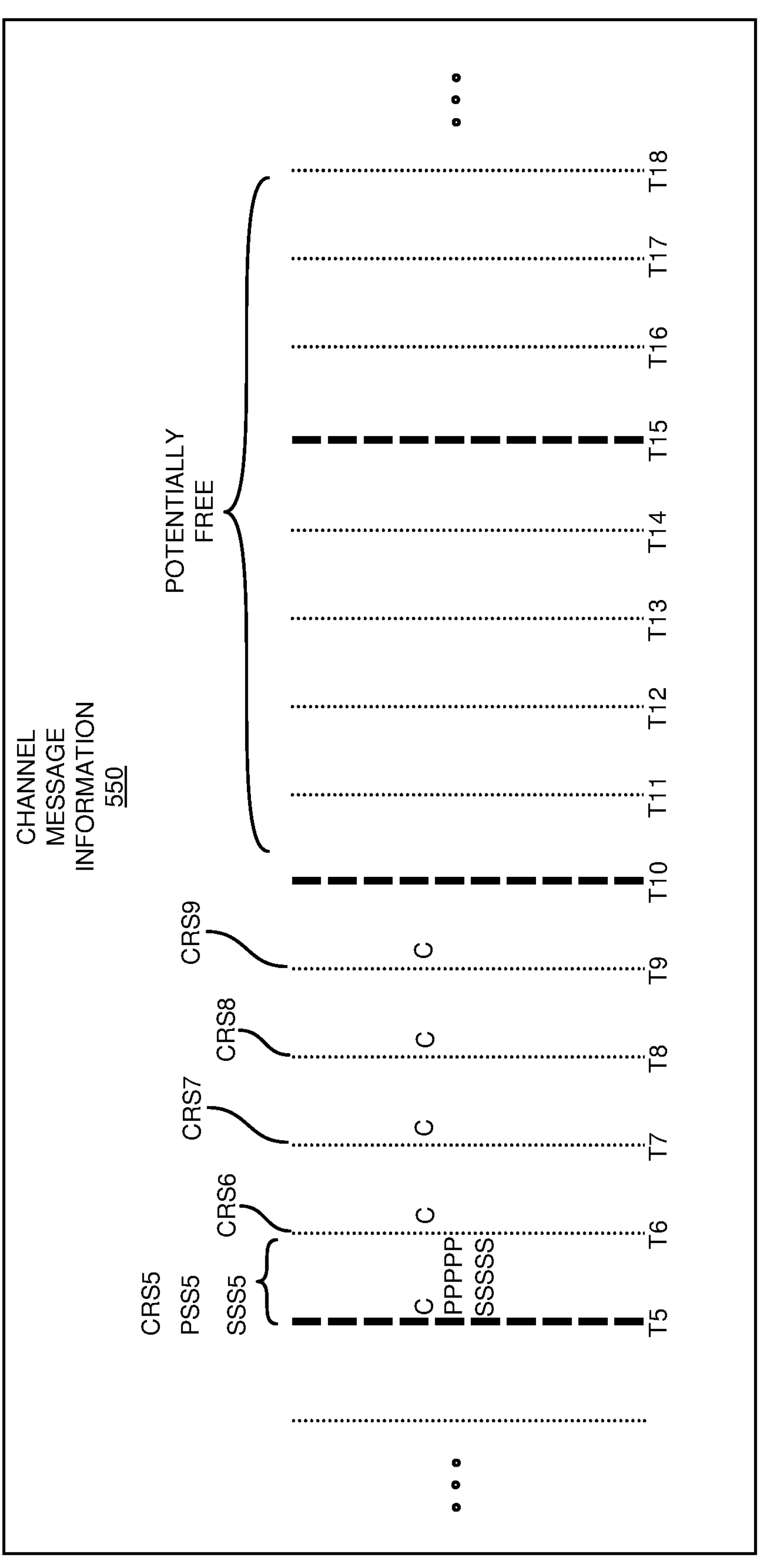
FIG. 5 is an example diagram illustrating channel message information according to embodiments herein.

FIG. 5 is an example diagram illustrating channel event information according to embodiments herein.

As further shown in this example embodiment, the channel message information 550 (different channel events) transmitted over the wireless signal 321 indicates that there are no messages such as CRS/PSS/SSS conveyed in respective timeslots after time T10. Accordingly, the wireless station monitoring the timeslots after time T10 learns that the wireless station is free to communicate in the unused time slots.

As previously discussed, communicating in one or more timeslots can include implementing a listen before talk technology to transmit over the shared wireless channel. Thus, communications from the wireless station communicating via the first wireless communication protocol are useful to identify events such as channel availability, presence of one or more first wireless stations communicating in the network environment 100 via a first wireless communication protocol, etc.

Figure 6:
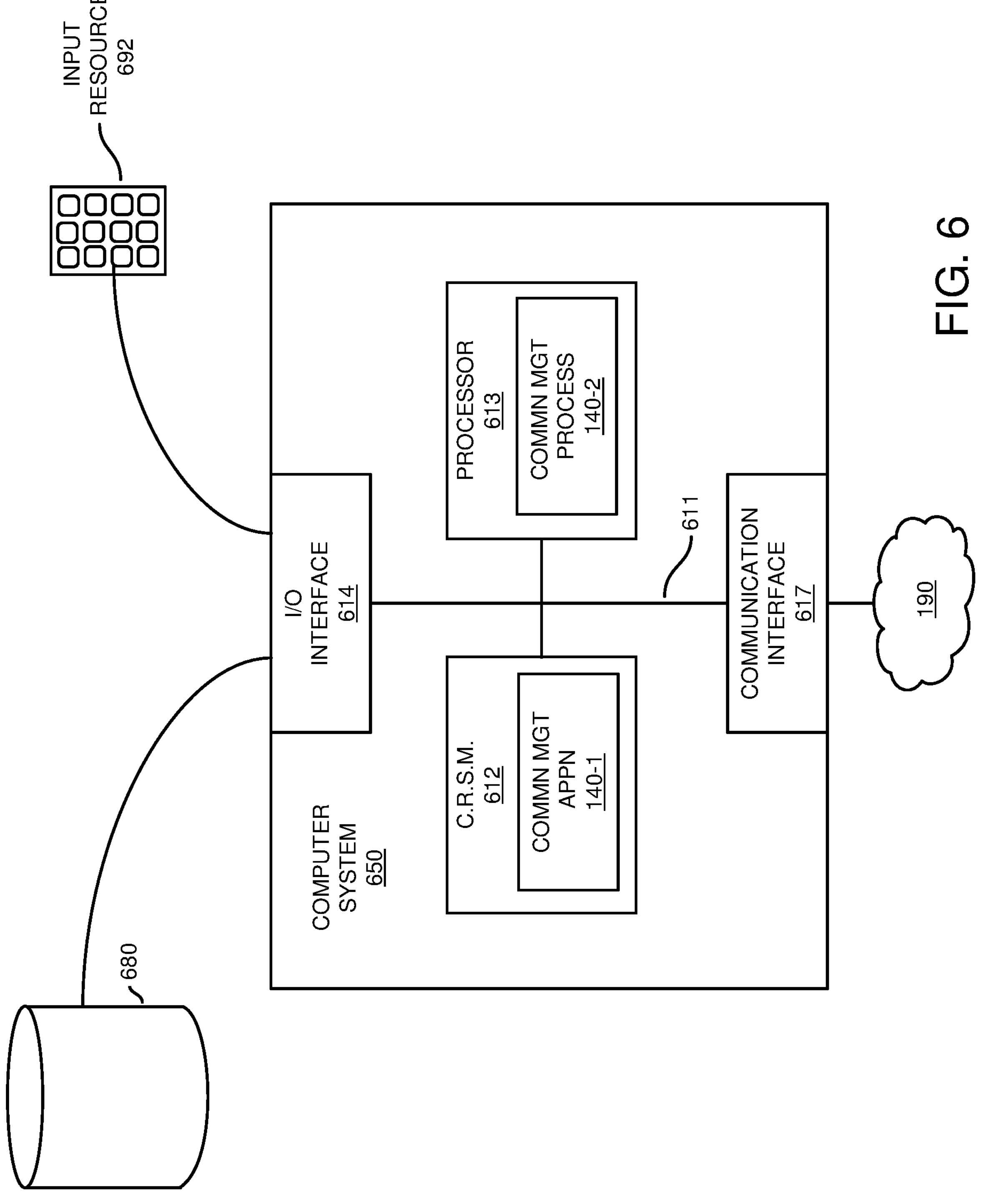
FIG. 6 is an example diagram illustrating example computer architecture operable to execute one or more operations according to embodiments herein.

FIG. 6 is an example block diagram of a computer system for implementing any of the operations as previously discussed according to embodiments herein.

Any of the resources (such as wireless station 126, controller hardware, management hardware, base station 121, base station 122, wireless station 141, wireless station 142, etc.) as discussed herein can be configured to include computer processor hardware and/or corresponding executable instructions to carry out the different operations as discussed herein.

As shown, computer system 650 of the present example includes interconnect 611 coupling computer readable storage media 612 such as a non-transitory type of media (which can be any suitable type of hardware storage medium in which digital information can be stored and or retrieved), a processor 613 (computer processor hardware), I/O interface 614, and a communications interface 617.

I/O interface(s) 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with communication management application 140-1 (e.g., including instructions) in a respective wireless station to carry out any of the operations as discussed herein.

During operation of one embodiment, processor 613 accesses computer readable storage media 612 via the use of interconnect 611 in order to launch, run, execute, interpret or otherwise perform the instructions in communication management application 140-1 stored on computer readable storage medium 612. Execution of the communication management application 140-1 produces communication management process 140 2 to carry out any of the operations and/or processes as discussed herein.

Those skilled in the art will understand that the computer system 650 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 650 may reside at any location or can be included in any suitable resource in any network environment to implement functionality as discussed herein.

Functionality supported by the different resources will now be discussed via flowcharts in FIGS. 7-8. Note that the steps in the flowcharts below can be executed in any suitable order.

Figure 7:
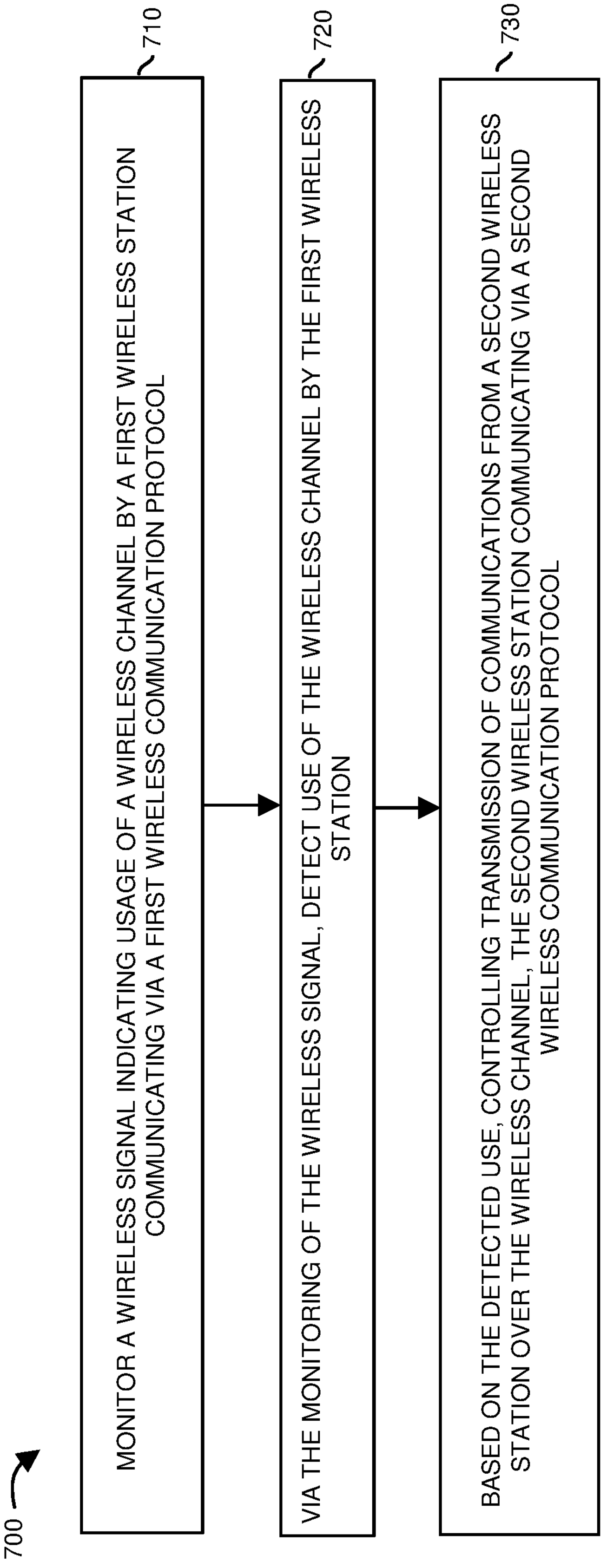
FIGS. 7-8 are example diagrams illustrating methods according to embodiments herein.

FIG. 7 is a flowchart 700 illustrating an example method according to embodiments herein. Note that there will be some overlap with respect to concepts as discussed above.

In processing operation 710, a wireless station (such as base station 122 or wireless station 142 supporting wireless communication protocol #2) monitors a wireless signal (such as control channel 135, broadcast signal 321, etc.) indicating usage of a wireless channel by a first wireless station communicating via a first wireless communication protocol (wireless communication protocol #1).

In processing operation 720, via the monitoring of the wireless signal, the wireless station detects use (actual or scheduled use) of the wireless channel by the first wireless station.

In processing operation 730, based on the detected use, the monitoring wireless station controls transmission of communications 132 via the second wireless communication protocol over the wireless channel.

Figure 8:
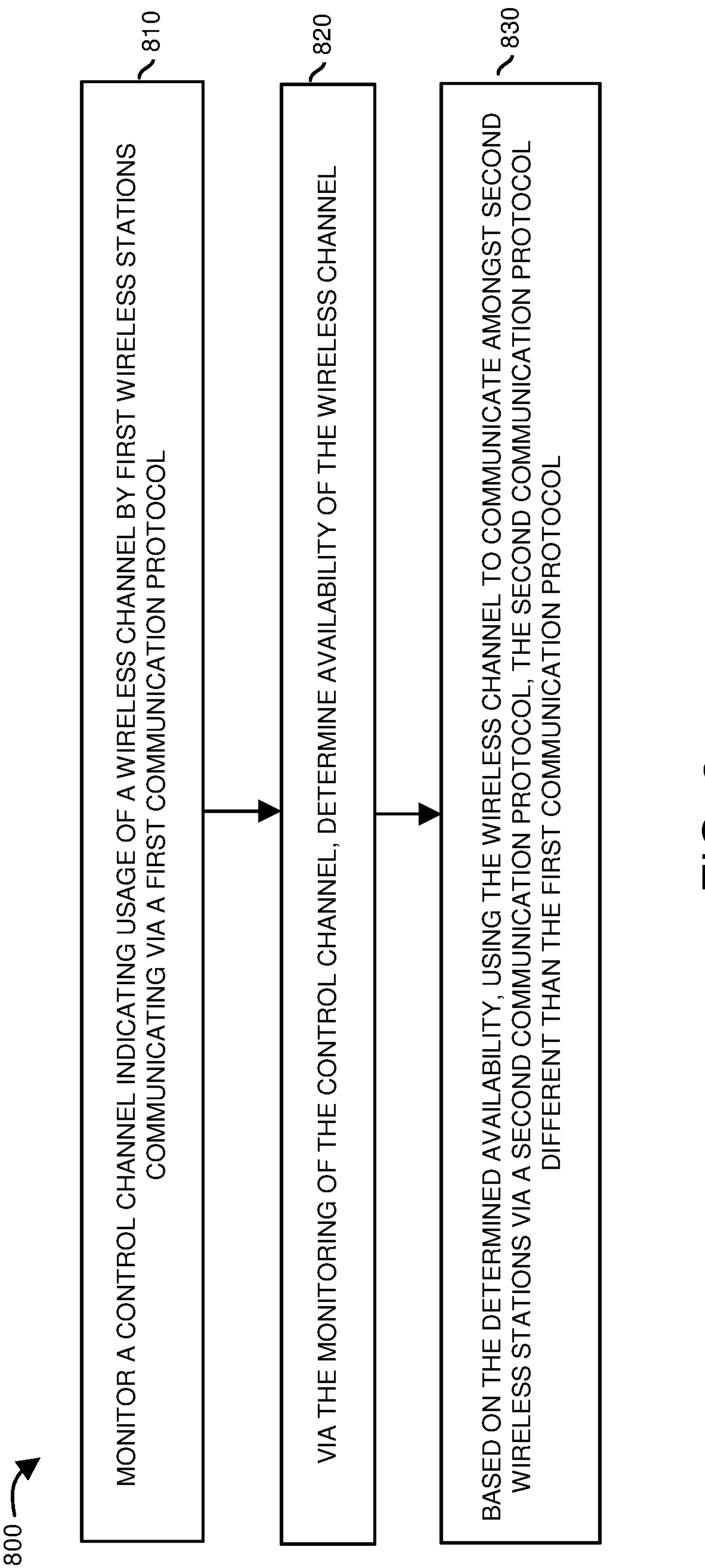

FIG. 8 is a flowchart 800 illustrating an example method according to embodiments. Note that there will be some overlap with respect to concepts as discussed above.

In processing operation 810, a wireless station monitors a control channel 135 indicating usage of a wireless channel by first wireless stations (such as base station 121 and wireless station 141) communicating via a first wireless communication protocol.

In processing operation 820, via the monitoring of the control channel 135, the wireless station determines availability of the wireless channel shared by communication devices in the network environment 100.

In processing operation 830, based on the determined availability, the wireless station uses the wireless channel to communicate via a second wireless communication protocol, the second communication protocol different than the first wireless communication protocol.

Note again that techniques herein are well suited to facilitate use of a shared wireless channel amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:

determining planned usage of a shared wireless channel;

producing schedule information indicating scheduled use of the shared wireless channel to convey first communications in accordance with a first wireless communication protocol; and utilizing the schedule information to control transmission of second communications via a second wireless communication protocol over the shared wireless channel.

2. The method as in claim 1, wherein the schedule information indicates a start time and an end time in which the first communications are scheduled for transmission over the shared wireless channel via the first wireless communication protocol.

3. The method as in claim 2, wherein the first communications include a first communication and a second communication;

wherein the schedule information indicates a first start time and a first end time in which the first communication is scheduled for transmission over the shared wireless channel via the first wireless communication protocol; and wherein the schedule information indicates a second start time and a second end time in which the second communication is scheduled for transmission over the shared wireless channel via the first wireless communication protocol.

4. The method as in claim 3, wherein the schedule information includes a gap indicating no communication scheduled between the first end time and a second start time.

5. The method as in claim 1, wherein the first communications are scheduled for transmission by a first wireless station via the first wireless communication protocol;

wherein utilizing the schedule information to control transmission of the second communications via the second wireless communication protocol over the shared wireless channel includes: based on the schedule information, controlling transmission of the second communications from a second wireless station to be in a first time gap as indicated by the schedule information, the second wireless station operative to transmit the second communications in the first time gap over the shared wireless channel via the second wireless communication protocol.

6. The method as in claim 5, wherein the first time gap is a first time duration disposed between a second time duration and a third time duration of the schedule information;

wherein the second time duration is scheduled to convey a first portion of the first communications for transmission over the shared wireless channel via the first wireless communication protocol; and wherein the second time duration is scheduled to convey a second portion of the first communications for transmission over the shared wireless channel via the first wireless communication protocol.

7. The method as in claim 1, wherein the schedule information indicates a first time duration in which no wireless communications are scheduled for communication over the shared wireless channel.

8. The method as in claim 7, wherein the first time duration is disposed between a second time duration and a third time duration of the schedule information, the schedule information indicating unavailability of the shared wireless channel in both the second time duration and the third time duration.

9. The method as in claim 1 further comprising:

transmitting the schedule information from a first wireless base station to a second wireless base station, the first wireless base station in communication with a first mobile communication device via the first wireless communication protocol; and wherein the schedule information indicates time slots in which the shared wireless channel is scheduled to convey the first communications from the first wireless base station to the first mobile communication device in accordance with the first wireless communication protocol.

10. The method as in claim 9, wherein the second wireless base station is operative to communicate with a second mobile communication device via the second wireless communication protocol during free time slots as specified by the schedule information.

11. The method as in claim 1, wherein utilizing the schedule information to control transmission of the second communications over the shared wireless channel via the second wireless communication protocol includes:

transmitting the schedule information in accordance with the first wireless communication protocol.

12. The method as in claim 1, wherein utilizing the schedule information to control transmission of the second communications over the shared wireless channel via the second wireless communication protocol includes:

based on the scheduled use of the shared wireless channel as indicated by the schedule information, deferring transmission of the second communications from a first wireless station to a second wireless station supporting the second wireless communication protocol.

13. The method as in claim 1, wherein the schedule information indicates time slots in which the first communications are scheduled for transmission over the shared wireless channel via the first wireless communication protocol.

14. The method as in claim 1 further comprising:
adjusting a wireless energy detection threshold level implemented by a wireless station based on the first communications transmitted over the shared wireless channel via the first wireless communication protocol.

15. The method as in claim 1 further comprising:
producing the schedule information to indicate availability of the shared wireless channel at different times.

16. The method as in claim 1, wherein determining planned use of the shared wireless channel includes:
monitoring for presence of a communication of a type selected from the group consisting of:
i) a PSS (Primary Synchronization Signal),
ii) a SSS (Secondary Synchronization Signal), and
iii) a CRS (Cell Specific Reference Signal) message, or
iv) a PDCCH (Physical Downlink Control Channel) message.

17. The method as in claim 1 further comprising:
producing the schedule information to indicate uplink and downlink communications scheduled for conveyance over the shared wireless channel.

18. The method as in claim 1 further comprising:
monitoring a particular timeslot in the shared wireless channel to determine that the shared wireless channel is not scheduled for use.

19. The method as in claim 1 further comprising:
determining the planned usage of the shared wireless channel based on monitoring the shared wireless channel.

20. The method as in claim 1, wherein the schedule information indicates a first time gap of a first time duration disposed between a second time duration and a third time duration of the schedule information;
wherein the second time duration is scheduled to convey a first portion of the first communications for transmission over the shared wireless channel via the first wireless communication protocol; and
wherein the third time duration is scheduled to convey a second portion of the first communications for transmission over the shared wireless channel via the first wireless communication protocol.

21. The method as in claim 1, wherein utilizing the schedule information to control transmission of second communications via the second wireless communication protocol over the shared wireless channel includes:
adjusting a wireless energy detection threshold level of accessing the shared wireless channel based on the first communications transmitted over the shared wireless channel to a first wireless station via the first wireless communication protocol, the first wireless station operative to implement the adjusted wireless energy detection threshold level.

22. The method as in claim 1, wherein utilizing the schedule information to control transmission of second communications via the second wireless communication protocol over the shared wireless channel includes:
broadcasting the schedule information to a wireless station over a control channel.

23. The method as in claim 1, wherein the schedule information indicates timing in which the shared wireless channel is scheduled for use by the first wireless communication protocol and scheduled for use by the second wireless communication protocol.

24. The method as in claim 1, wherein the first communications are encoded in accordance with the first wireless communication protocol; and
wherein the second communications are encoded in accordance with the second wireless communication protocol.

25. A method comprising:
monitoring a wireless signal indicating scheduled usage of a wireless channel by a first wireless station communicating via a first wireless communication protocol;
via the monitoring of the wireless signal, detecting scheduling information indicating usage of the wireless channel by the first wireless station to wirelessly communicate via the first wireless communication protocol; and
based on the detected scheduling information, controlling transmission of communications from a second wireless station to be in gaps as indicated by the schedule information, the second wireless station transmitting the communications over the wireless channel in the gaps via a second wireless communication protocol.

26. The method as in claim 25, wherein monitoring the wireless signal comprises monitoring a control channel of the wireless signal, the control channel indicating usage of the wireless channel by first wireless stations communicating via the first wireless communication protocol.

27. The method as in claim 26, wherein monitoring the control channel includes receiving scheduling information indicating: i) a first time range in which the first wireless stations are scheduled to use the wireless channel, and ii) a second time range in which the first wireless stations are not scheduled to use the wireless channel.

28. The method as in claim 25, wherein controlling transmission of the communications from the second wireless station over the wireless channel includes:
based on the detected scheduling information, deferring transmission of the communications from the second wireless station to a third wireless station, the second wireless station in communication with the third wireless station via use of the second wireless communication protocol.

29. The method as in claim 25, wherein controlling transmission of the communications from the second wireless station over the wireless channel includes:
communicating from the second wireless station to a third wireless station during the gaps, wherein the first wireless station does not use the wireless channel during the gaps.

30. The method as in claim 25, wherein controlling transmission of the communications from the second wireless station over the wireless channel includes:
communicating a scheduling request from the second wireless station over the wireless channel to a third wireless station supporting the second wireless communication protocol; and
from the third wireless station notifying the second wireless station to communicate in a particular time slot that does not interfere with scheduled communications over the wireless channel via the first wireless communication protocol.

31. The method as in claim 25, wherein controlling transmission of the communications from the second wireless station over the wireless channel includes:

adjusting a wireless energy detection threshold value of the second wireless station based on communications transmitted over the wireless channel via the first wireless communication protocol.

32. The method as in claim 25 further comprising:

in response to detecting presence of at least one symbol in the wireless signal indicating use of the wireless channel by the first wireless station, preventing use of the wireless channel by the second wireless station.

33. The method as in claim 25 further comprising:

in response to detecting absence of at least one symbol in the wireless signal, which indicates non-use of the wireless channel by the first wireless station, monitoring a level of wireless energy in the wireless channel to determine whether to transmit from the second wireless station over the wireless channel.

34. A system comprising:

a first wireless station in a wireless network environment, the first wireless station operative to:

determine planned usage of a shared wireless channel;

produce schedule information indicating scheduled use of the shared wireless channel to convey first communications in accordance with a first wireless communication protocol; and utilize the schedule information to control transmission of second communications via a second wireless communication protocol over the shared wireless channel.

35. The system as in claim 34, wherein the first wireless station is further operative to:

wirelessly transmit the schedule information in accordance with the first wireless communication protocol.

36. The system as in claim 34, wherein the first wireless station is further operative to:

based on the scheduled use of the shared wireless channel as indicated by the schedule information, defer transmission of the second communications from a second wireless station to a third wireless station supporting the second wireless communication protocol.

37. The system as in claim 34, wherein the schedule information indicates time durations in which the first communications are scheduled for transmission over the shared wireless channel via the first wireless communication protocol.

38. The system as in claim 34, wherein the first wireless station is further operative to:

adjust a wireless energy detection threshold level implemented by the first wireless station based on the first communications transmitted over the shared wireless channel via the first wireless communication protocol.

39. The system as in claim 34, wherein the first wireless station is further operative to:

produce the schedule information to indicate availability of the shared wireless channel.

40. The system as in claim 34, wherein the first wireless station is further operative to:

monitor for presence of a communication of a type selected from the group consisting of:

i) a PSS (Primary Synchronization Signal), ii) a SSS (Secondary Synchronization Signal), and iii) a CRS (Cell Specific Reference Signal) message, or iv) a PDCCH (Physical Downlink Control Channel) message.

41. The system as in claim 34, wherein the first wireless station is further operative to:

produce the schedule information to indicate uplink and downlink communications scheduled over the shared wireless channel.

42. The system as in claim 34, wherein the first wireless station is further operative to:

monitor a particular timeslot in the shared wireless channel to determine that the shared wireless channel is not scheduled for use.

43. The system as in claim 34, wherein the first wireless station is further operative to:

determine the planned usage of the shared wireless channel based on monitoring the shared wireless channel.

44. A method comprising:

receiving schedule information indicating scheduled usage of a wireless channel to convey first communications encoded in accordance with a first wireless communication protocol; and based on determined availability of the wireless channel as indicated by the schedule information, using the wireless channel to communicate via a second wireless communication protocol, the second wireless communication protocol different than the first wireless communication protocol.

45. The method as in claim 44 further comprising:

deferring use of the wireless channel to communicate using the second wireless communication protocol in response to detecting, from the schedule information, that the wireless channel is scheduled for use to support the first communications.

46. The method as in claim 44, wherein the schedule information is received over a control channel in accordance with the first wireless communication protocol.

* * * * *